United States Patent
Ahn et al.

(10) Patent No.: US 8,228,796 B2
(45) Date of Patent: Jul. 24, 2012

(54) ETHERNET SWITCHING APPARATUS, AND METHOD FOR REDUCING POWER CONSUMPTION OF THE SAME

(75) Inventors: Kye-hyun Ahn, Daejeon-si (KR); Je-soo Ko, Dajeon-si (KR)

(73) Assignee: Electronics and Telecommunications Research Institute (KR)

( * ) Notice: Subject to any disclaimer, the term of this patent is extended or adjusted under 35 U.S.C. 154(b) by 244 days.

(21) Appl. No.: 12/621,473

(22) Filed: Nov. 18, 2009

(65) Prior Publication Data
US 2010/0150163 A1   Jun. 17, 2010

(30) Foreign Application Priority Data
Dec. 12, 2008   (KR) .................. 10-2008-0126736

(51) Int. Cl.
*H04L 12/26* (2006.01)
(52) U.S. Cl. ......... 370/232; 370/419; 709/232; 713/320
(58) Field of Classification Search .................. None
See application file for complete search history.

(56) References Cited

U.S. PATENT DOCUMENTS

| | | | | |
|---|---|---|---|---|
| 6,167,054 | A * | 12/2000 | Simmons et al. | 370/422 |
| 6,628,613 | B1 * | 9/2003 | Joung et al. | 370/230 |
| 7,525,911 | B2 | 4/2009 | Hara et al. | |
| 7,573,940 | B2 * | 8/2009 | Connor et al. | 375/257 |
| 2003/0223414 | A1 | 12/2003 | Wong | |
| 2006/0120289 | A1 * | 6/2006 | Cunningham | 370/235 |
| 2007/0127581 | A1 * | 6/2007 | Connor et al. | 375/257 |
| 2008/0165888 | A1 | 7/2008 | Wiggins et al. | |
| 2009/0077401 | A1 * | 3/2009 | Tsai | 713/320 |
| 2009/0327506 | A1 * | 12/2009 | Diab | 709/230 |
| 2010/0023658 | A1 * | 1/2010 | Diab et al. | 710/59 |
| 2010/0128738 | A1 * | 5/2010 | Barrass | 370/445 |

FOREIGN PATENT DOCUMENTS

| | | |
|---|---|---|
| JP | 11-055305 | 2/1999 |
| JP | 2004-104427 | 4/2004 |
| KR | 2001-0045783 | 6/2001 |
| KR | 10-0334811 | 5/2002 |
| KR | 10-2006-0058355 | 5/2006 |

OTHER PUBLICATIONS

Blanquicet, Francisco, "Pause Power Cycle: A New Backwards Compatible Method to Reduce Energy Use of Ethernet Switches," *Ethernet Alliance*, Beaverton, Oregon, Version 1.0, Apr. 2008, pp. 1-14.

* cited by examiner

*Primary Examiner* — Brian Roberts
(74) *Attorney, Agent, or Firm* — Blakely, Sokoloff, Taylor & Zafman

(57) ABSTRACT

A method for reducing power consumption in an Ethernet switch is provided. The method includes: checking a state of packet data input through each of connection ports; detecting a connection port which has a packet rate lower than a predetermined reference value based on a result of the checking; and generating a data transfer control frame with respect to the connection port having the low packet rate and transmitting the generated data transfer control frame to an Ethernet apparatus connected to the corresponding connection port. Accordingly, a transmission line between the Ethernet switch and an Ethernet apparatus having the low to transmission rate is maintained in a low-power state, thereby reducing energy consumption in both Ethernet apparatuses.

10 Claims, 5 Drawing Sheets

ETHERNET SWITCHING APPARATUS, AND METHOD FOR REDUCING POWER CONSUMPTION OF THE SAME

CROSS REFERENCE TO RELATED APPLICATION

This application claims the benefit under 35 U.S.C. §119(a) of Korean Patent Application No. 10-2008-0126736, filed on Dec. 12, 2008, the disclosure of which is incorporated herein in its entirety by reference.

BACKGROUND

1. Field

The following description relates to an Ethernet switch, and more particularly, to a method for reducing power consumption in an Ethernet switch.

2. Description of the Related Art

In recent times interest has been increasing in low-power design and environment-friendly IT technologies in light of economic and environmental issues.

In line with these trends, an issue arises regarding the reduction of energy consumption in network equipment connected to the Internet. Especially, use of an Ethernet switch and terminals connected to Ethernet is gradually increasing, and is being developed in order to provide ever widening bandwidths. To provide a ever widening bandwidths, power consumption is inevitably increased. For example, an Ethernet link of 1 GB consumes 4 watts more of electricity than an Ethernet link of 100 MB, and an Ethernet link of 10 GB consumes about 10 to 20 watts more of electricity than the Ethernet link of 100 MB.

However, a utilization rate of such links is low and a bandwidth narrower than the maximum available bandwidth is invariably only used.

There is no relation between the power consumption and the utilization rate of the link. Using such characteristic, technologies have been introduced to reduce energy consumption in an Ethernet apparatus.

The Institute of Electrical and Electronics Engineers (IEEE) which is an international standardization organization for networking industry established IEEE802.3az Energy Efficient Ethernet group to research technologies for saving energy by using an Ethernet interface that lowers a link processing speed when not all network links are used.

For example, a technique called rapid PHY selection (RPS) is proposed based on the fact that an Ethernet link between a desktop computer and a switch is usually maintained in a pause to state in which there is no data transmission. According to RPS, a low-data-rate PHY is used when utilization of the link is low, and a high-data-rate PHY is used when utilization of the link is high, so that overall energy consumed by the desktop and the switch can be reduced. Also, an adaptive link rate (ALR) technology has been investigated, which controls a data rate of an Ethernet link according to the utilization rate of the Ethernet link, similar to RPS.

However, for the above-described techniques, solutions also have to be considered for issues such as a PHY interface exchange with a corresponding apparatus, negotiation for adjusting a transmission rate of a link and synchronization for preventing frame loss. Moreover, such techniques can be implemented in future Ethernet apparatuses, but cannot be easily applied to the existing Ethernet equipment.

Meanwhile, as a power reduction method applicable to the existing standard Ethernet switching apparatus, a method of periodically transmitting a PAUSE frame from an Ethernet switch to all Ethernet apparatuses connected to the Ethernet switch has been proposed.

This method periodically generates a PAUSE frame and transmits the PAUSE frame through all ports connected to the Ethernet switch. However, in this case, since the transmission of a PAUSE frame is performed based on a cycle, a data packet transfer is paused by the PAUSE frame transmitted according to the cycle even when the data packet is actively being transferred, and thus data transfer delay may occur.

In addition, since the Ethernet switch transmits the PAUSE frame through all connected links, packet transmission from Ethernet apparatuses having a high link utilization rate may be blocked. That is, it may be problematic in that packet transfer delay and resulting congestion may occur.

SUMMARY

Accordingly, in one aspect, there is provided an Ethernet switch which minimizes packet transfer delay, thereby reducing energy consumption while avoiding congestion.

In addition, there is provided a power consumption reduction method which is easily applied to existing Ethernet devices.

According to an aspect, there is provided a method for reducing power consumption of an Ethernet switching apparatus including a plurality of connection ports, each connected to an Ethernet apparatus, including: checking a state of packet data input through each of the connection ports; detecting a connection port which has a packet rate lower than a predetermined reference value based on results of the checking; and generating a data transfer control frame with respect to the connection port having the low packet rate and transmitting the generated data transfer control frame to an Ethernet apparatus connected to the corresponding connection port.

The data transfer control frame may be a PAUSE frame.

The method may further include, after the detecting of the connection port, determining a duration of the PAUSE frame, wherein the transmitting of the data transfer control frame comprises generating the PAUSE frame such that a pause state is maintained for the determined duration.

The checking of the state of packet data may include counting up or down according to the number of packet data input or output through each of the plurality of connection ports and the detecting of the connection port comprises detecting the connection port which has the lowest packet rate among the plurality of connection ports based on the count value. Alternatively, the detecting of the connection port may include detecting the connection port having a low packet rate when underflow occurs in an input buffer in which the input packet data is stored.

According to another aspect, there is provided an Ethernet switching apparatus including: a plurality of connection ports, each connected to an Ethernet apparatus; and a control unit to comprise and control a control frame generating unit to generate a data transfer control frame with respect to a connection port having a packet rate lower than a predetermined reference value among the plurality of connection ports based on a state of packet data input through each connection port and to transmit the generated data transfer control frame to an Ethernet apparatus connected to the corresponding connection port.

The data transfer control frame may be a PAUSE frame.

The control unit may further include a duration setting unit to determine a duration of the PAUSE frame and the control frame generating unit generates the PAUSE frame such that a pause state is maintained for the determined duration.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves those of ordinary skill in the art. Descriptions of well-known functions and structures are omitted to enhance clarity and conciseness.

Figure 1:
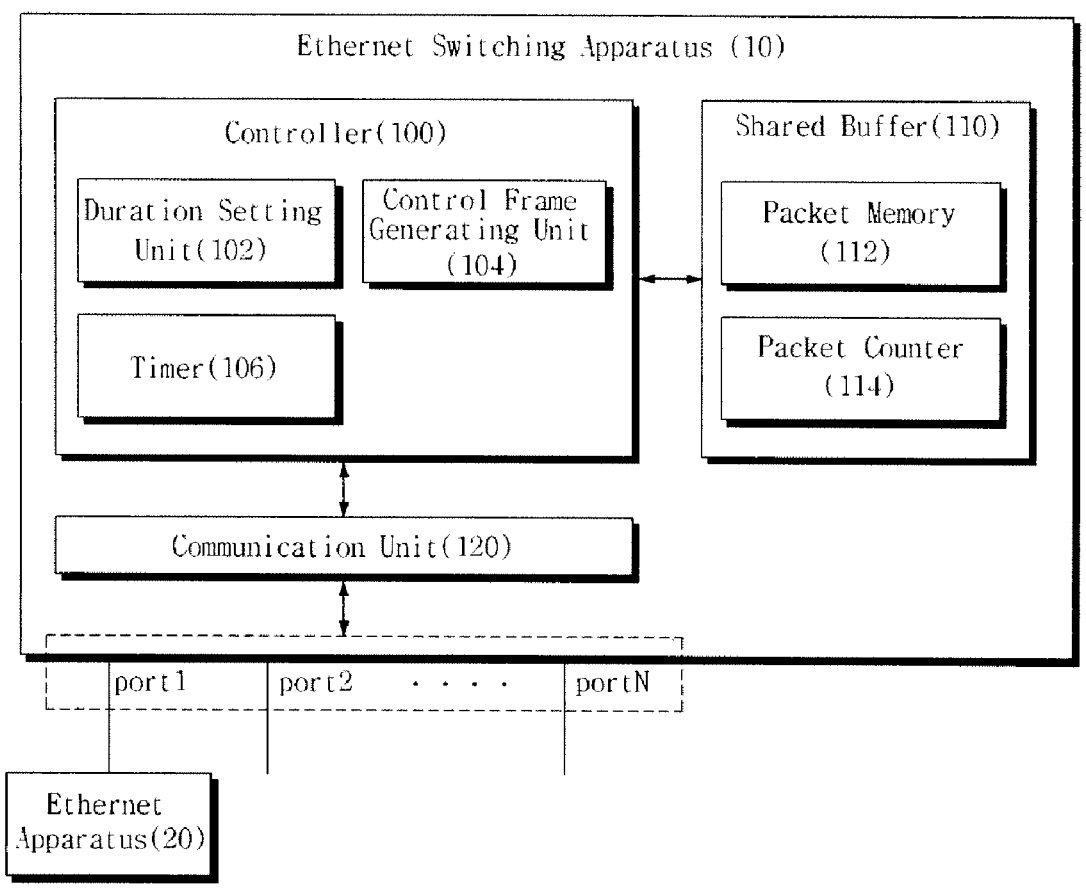
FIG. 1 is a block diagram illustrating an Ethernet switching apparatus 10 according to an exemplary embodiment.

FIG. 1 is a block diagram illustrating an Ethernet switching apparatus 10 according to an exemplary embodiment.

As shown in FIG. 1, the Ethernet switching apparatus 10 includes a plurality of connection ports 1, 2, . . . , N, and one of them is connected to an Ethernet apparatus 20. The Ethernet switching apparatus 10 transmits and receives packet data to/from the Ethernet apparatus 20. The Ethernet apparatus 20 connected to the connection port of the Ethernet switching apparatus 10 may be an Ethernet switching apparatus or a data terminal equipment (DTE).

In an exemplary embodiment, the Ethernet switching apparatus 10 further includes a communication unit 120, a shared buffer 110, and a control unit 100.

The communication unit 120 is implemented as an Ethernet communication module. In the exemplary embodiment, the communication unit 120 transmits and receives packet data to/from an external Ethernet apparatus through the plurality of ports 1, 2, . . . , N.

The shared buffer 110 includes a packet memory to store all data packets input through all of the connection ports 1, 2, . . . , N included in the Ethernet switching apparatus 10 and a packet memory interface unit for interfacing with the control unit 100. In this case, the shared buffer 110 includes a number of packet counters 114 corresponding to the number N of the connection ports 1, 2, . . . , N. The packet counter 114 may be provided in the packet memory interface unit. Alternatively, there may be provided a plurality of packet counters 114 connected respectively to connection ports 1, 2, . . . , N to independently count data packets input or output through each connection port.

The packet counter 114 counts up when packet data input through a corresponding connection port is stored in a packet memory 112, and counts down when packet data corresponding to the connection port is read out from the packet memory 112.

The control unit 100 may be implemented as a microprocessor. In an exemplary embodiment, the control unit 100 may control the entire operation of the Ethernet switching apparatus 10 and set information regarding a threshold which indicates there is little packet data in an input buffer at a corresponding port at an initialization stage or at an arbitrary time (hereinafter this threshold will be referred to as "underflow threshold" for convenience).

In detail, the control unit 100 includes a duration setting unit 102, a control frame generating unit 104, and a timer 106.

The duration setting unit 102 determines a period of time for which a pause state is maintained by a PAUSE frame, based on duration information determined by the control unit 100 at the initialization stage.

In an exemplary embodiment, the duration setting unit 102 may be configured to determine the duration as a fixed value once it is determined to generate a PAUSE frame. However, alternatively the duration setting unit 102 may determine the duration using a grading scheme according to a count value of the packet counter or the amount of data in an input buffer.

For example, a predetermined threshold reference value is set smaller than the underflow threshold, and it is determined that a PAUSE frame is to be generated when underflow occurs in the input buffer. In this case, if the amount of data in the input buffer is smaller than the threshold reference value, the duration is set to the maximum duration value. On the other hand, if the amount of data is smaller than the underflow threshold but greater than the predetermined threshold reference value, the duration is set to half of the maximum duration value. However, the setting of the duration is not limited to the above-described, and the duration setting unit 102 may be configured to arrange the threshold reference value into numerous grades and to determine a duration on the basis of the grades.

The control frame generating unit 104 monitors a counting status of the packet counter 114 to determine whether to generate a control frame. In an exemplary embodiment, the control frame generating unit 104 monitors the result of counting by the packet counter 114 and determines whether to generate the control frame on the basis of a count value with respect to each connection port. In this case, the control frame generating unit 104 generates a PAUSE frame on the basis of the duration determined by the duration setting unit 102 such that a pause state lasts for the determined duration.

More specifically, based on the count value, the control frame generating unit 104 generates a data transfer control frame when the amount of packet data received through a connection port is smaller than a predetermined amount. In addition, the control frame generating unit 104 may generate a data transfer control frame when an underflow occurs in the input buffer where packet data is received through a connection port. In an exemplary embodiment, the data transfer control frame is a PAUSE frame.

The control unit 100 transmits the PAUSE frame generated by the control frame generating unit 104 to the Ethernet apparatus 20 through the communication unit 120, and activates the timer 106. Then, the control unit 100 monitors whether a pause state is maintained for the duration set by the duration setting unit 102 according to a value of the timer 106.

In an exemplary embodiment, the control frame generating unit 104 and the timer 106 may be implemented in a media access controller (MAC). The MAC may be provided to each respective connection port of the Ethernet switching apparatus 10 to perform a media access control.

Figure 2:
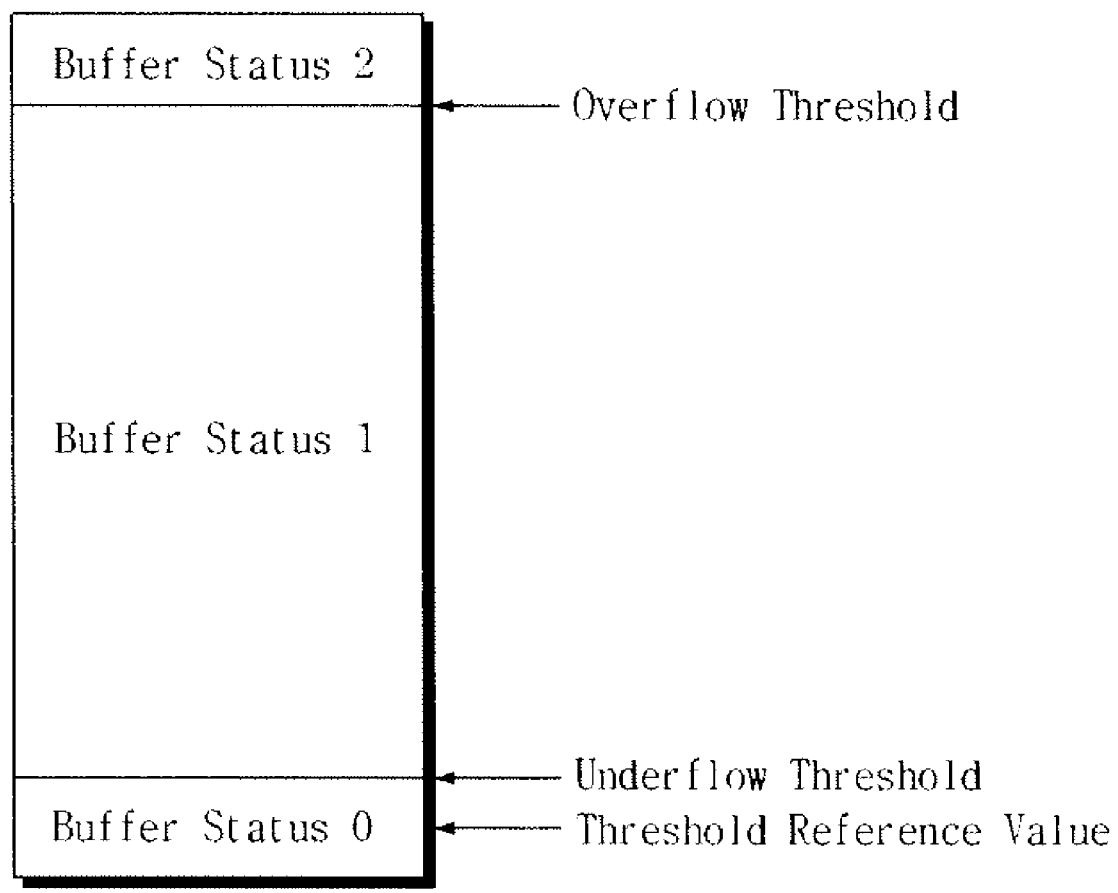
FIG. 2 illustrates an input buffer according to an exemplary embodiment.

FIG. 2 illustrates an input buffer according to an exemplary embodiment. The input buffer has a predetermined underflow threshold to determine whether there is little or no amount of stored packet data. The underflow threshold which is a very small value close to zero is set by the control unit 100. As described above, it is determined that data utilization on a port corresponding to the input buffer is low if the amount of data in the input buffer is smaller than the underflow threshold, and at this time, the underflow threshold functions as a reference value for generating a PAUSE frame.

Additionally, an overflow threshold may be set to detect data congestion and transmit a PAUSE frame for relieving the congestion. The overflow threshold may be set close to the maximum amount of data to be stored in the input buffer.

A threshold reference value is set smaller than the underflow threshold. In addition, one or more values can be set as the threshold reference value.

Figure 3:
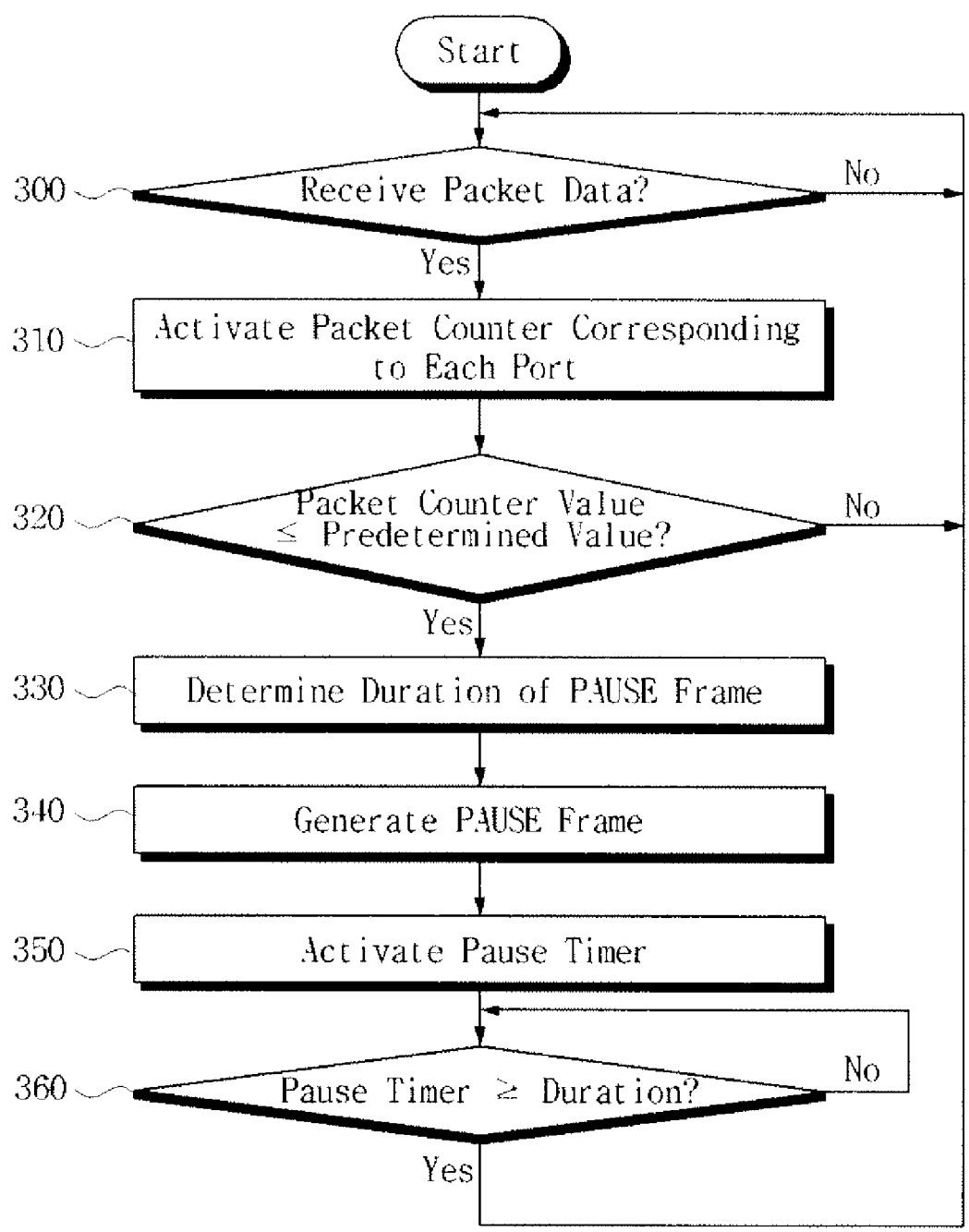
FIG. 3 is a flowchart illustrating a power consumption reduction method of an Ethernet switching apparatus.

FIG. 3 is a flowchart illustrating a power consumption reduction method of an Ethernet switching apparatus.

First, when packet data is received from an external Ethernet apparatus through a connection port (operation 300), a packet counter corresponding to the connection port is activated (operation 310).

At this time, a packet counter is individually provided to each port to monitor the amount of packet data to be received through the corresponding port. In detail, the packet counter counts up when packet data input through the corresponding connection port is stored in a packet memory, and counts down when packet data corresponding to the connection port is read out from the packet memory.

Then, a data transfer state on the port is determined by determining whether a value of the packet counter is below a predetermined value (operation 320). When the value of the packet counter is below the predetermined value, it is determined that a packet rate on the connection port corresponding to the packet counter is low and a duration for which a pause state is maintained by a PAUSE frame is set (operation 330). The duration may be a predetermined value or a value determined according to the amount of packet data received through the corresponding connection port.

Then the PAUSE frame containing duration information is generated (operation 340), and is transmitted to a remote Ethernet apparatus connected to the connection port. By transmitting the PAUSE frame, an Ethernet transmission line between the Ethernet switching apparatus and the Ethernet apparatus stays in a pause state, i.e., a low-power state. That is, a transmission line to an Ethernet apparatus to which a small amount of data is transferred is independently controlled to stay in a low-power state, thereby effectively reducing power consumption.

After transmitting the PAUSE frame, a pause timer is activated (operation 350), and the Ethernet transmission line between the Ethernet switching apparatus and the Ethernet apparatus is maintained in a pause state for the set duration (operation 360). Accordingly, the Ethernet transmission line between the Ethernet switching apparatus and the Ethernet apparatus having a low packet rate can be maintained in a low-power state, thereby reducing the power consumption of the Ethernet apparatus.

Figure 4:
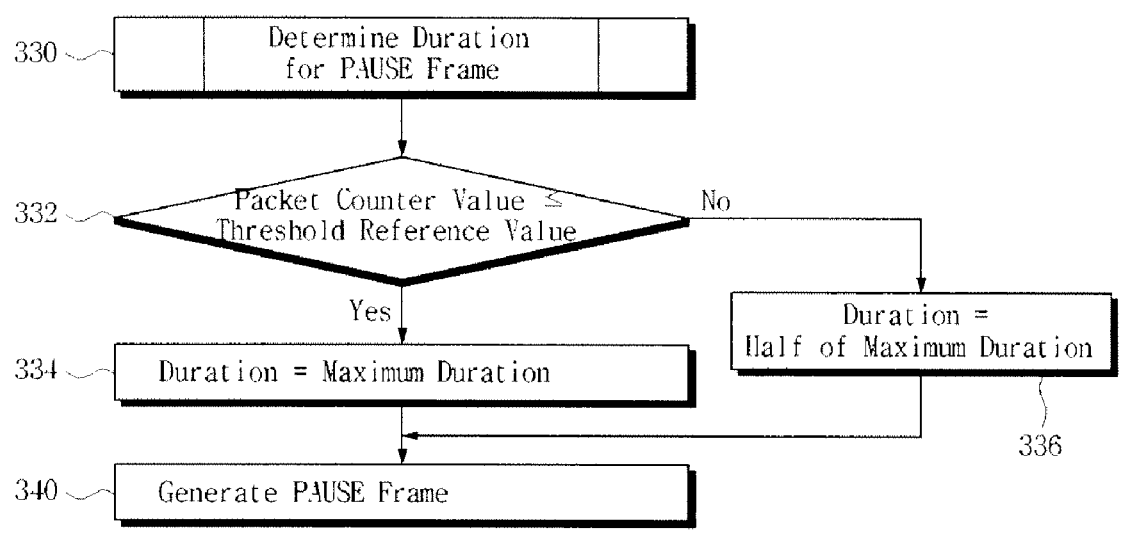
FIG. 4 is a flowchart illustrating a duration setting method according to an exemplary embodiment.

FIG. 4 is a flowchart illustrating a duration setting method according to an exemplary embodiment.

To set a duration for which a pause state lasts, it is determined whether a value of a packet counter is smaller than a threshold reference value (operation 332). The threshold reference value is set to be smaller than a threshold for determining an occurrence of an underflow, and one or more values can be set as the threshold reference value. The threshold reference value is used to determine a duration for which a pause state due to a PAUSE frame will be maintained. When a value of the packet counter is smaller than the threshold reference value, a predetermined maximum duration is set as the duration for the pause state (operation 334). Alternatively, when the value of the packet counter is smaller than an underflow threshold but greater than the threshold reference value, the duration is set to half of the maximum duration (operation 336). However, the duration determination is not limited to the above-described, and there may be two or more set threshold reference values and two or more durations may be set corresponding to the numerous threshold reference values.

Figure 5:
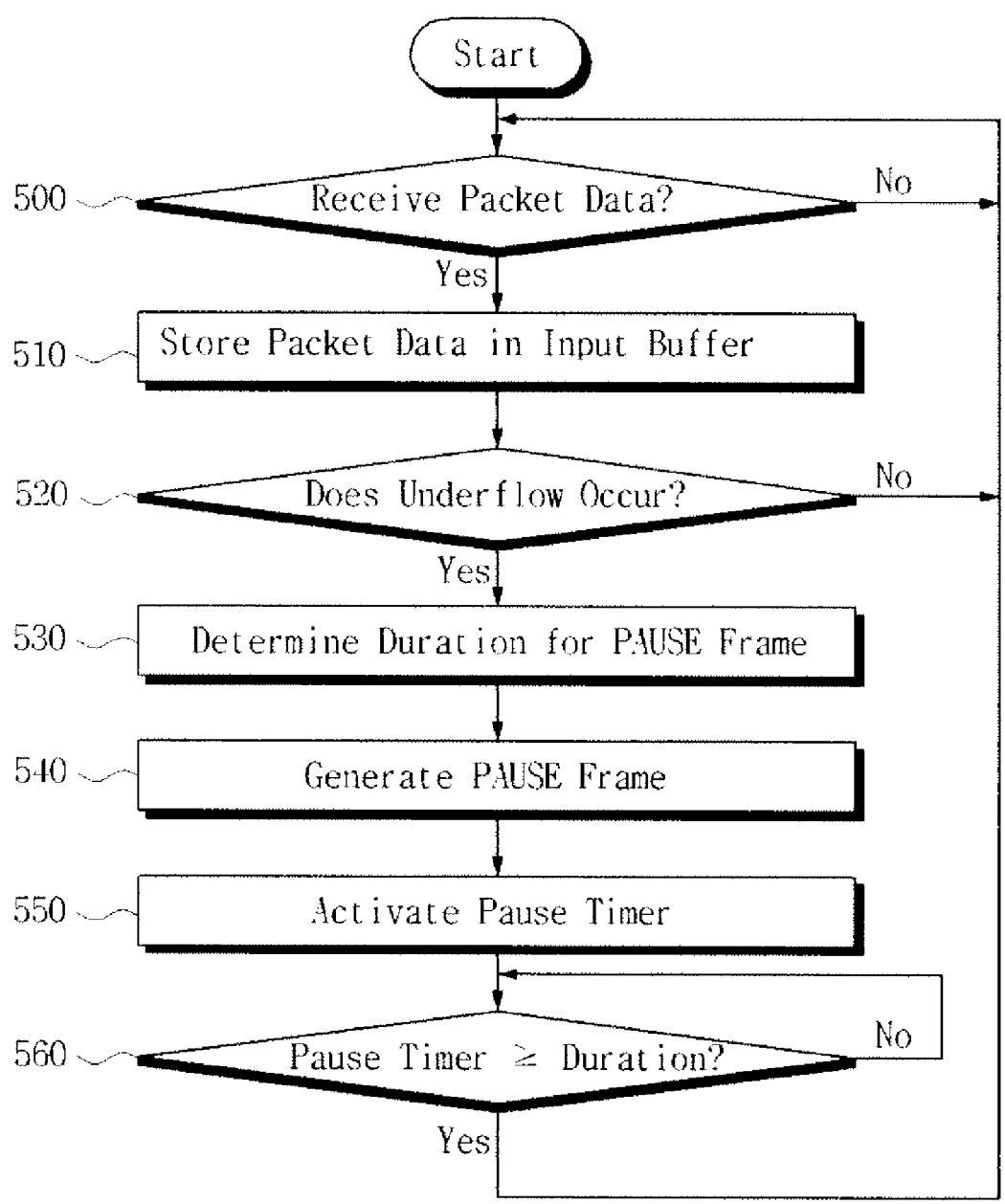
FIG. 5 is flowchart illustrating a power consumption reduction method in an Ethernet apparatus according to an exemplary embodiment.

FIG. 5 is flowchart illustrating a power consumption reduction method in an Ethernet apparatus according to an exemplary embodiment.

Packet data is received through a connection port from an external Ethernet apparatus (operation 500), and the received packet data is stored in an input buffer (operation 510).

It is checked whether an underflow occurs in the input buffer by monitoring the input buffer (operation 520). An underflow threshold of the input buffer is a predetermined value close to zero. The occurrence of underflow indicates there is little packet data in the input buffer.

When underflow occurs, it is determined that a packet rate on the connection port corresponding to the input buffer is low, and the duration of a PAUSE frame is determined (operation 530). The duration may be a predetermined fixed value or may be determined differently according to the amount of packet data received through the corresponding connection port.

A PAUSE frame is generated to contain duration information (operation 540), and then the generated PAUSE frame is transmitted to a remote Ethernet apparatus connected to the connection port. By transmitting the PAUSE frame, an Ethernet transmission line between an Ethernet switching apparatus and the Ethernet apparatus is maintained in a pause state, i.e., a low-power state. That is, a packet transmission line to an Ethernet apparatus through which a small amount of data is transmitted is individually controlled to stay in a low-power state, thereby efficiently reducing power consumption.

A pause timer is activated after transmitting the PAUSE frame (operation 550) such that the Ethernet transmission line between the Ethernet switching apparatus and the Ethernet apparatus is maintained in a pause state for the determined duration. As the result, the Ethernet transmission line between the Ethernet switching apparatus and the Ethernet apparatus having a low packet transmission rate can be maintained in a low-power state, thereby reducing power consumption of the Ethernet apparatus.

Accordingly, a transmission line between an Ethernet switching apparatus and an Ethernet apparatus having a low data transmission rate is maintained in a low-power state, thereby reducing power consumption of both Ethernet apparatuses.

Also, the number of packets input through each connection port of the Ethernet switching apparatus is monitored, and a PAUSE frame is transmitted with respect to each connection port based on the monitoring result, thereby allowing only Ethernet apparatuses having a low data transmission rate to save power individually without affecting the connection state of other Ethernet apparatuses connected to different connection ports.

The power consumption reduction method of an Ethernet switching apparatus described above may be recorded, stored, or fixed in one or more computer-readable media that includes program instructions to be implemented by a computer to cause a processor to execute or perform the program instructions. Examples of computer-readable media include magnetic media, optical media and the like.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for reducing power consumption of an Ethernet switching apparatus including a plurality of connection ports, each connected to an Ethernet apparatus, comprising:

checking a state of packet data input through each of the connection ports;

detecting a connection port which has a packet rate lower than a predetermined reference value based on results of the checking;

determining a duration of a PAUSE frame, wherein the determining of the duration comprises setting the duration to a predetermined maximum duration if the amount of packet data input through the detected connection port is smaller than a predetermined threshold reference value and otherwise setting to half of the predetermined maximum duration;

generating a data transfer control frame with respect to the detected connection port and transmitting the generated data transfer control frame to an Ethernet apparatus connected to the detected connection port wherein the data transfer control frame is the PAUSE frame, wherein the transmitting of the data transfer control frame comprises generating the PAUSE frame such that a pause state is maintained for the determined duration.

2. The method of claim 1, wherein the determining of the duration further comprises determining the duration using a grading scheme according to the amount of packet data input through the detected connection port.

3. The method of claim 1, wherein the checking of the state of packet data comprises counting up or down according to the number of packet data input or output through each of the plurality of connection ports and the detecting of the connection port comprises detecting the connection port which has the lowest packet rate among the plurality of connection ports based on the count value.

4. The method of claim 1, wherein the detecting of the connection port comprises detecting the connection port having a low packet rate when underflow occurs in an input buffer in which the input packet data is stored.

5. An Ethernet switching apparatus comprising:

a plurality of connection ports, each connected to an Ethernet apparatus; and a control unit comprising:

(i) a control frame generating unit to generate a data transfer control frame with respect to a connection port having a packet rate lower than a predetermined reference value among the plurality of connection ports based on a state of packet data input through each connection port and to transmit the generated data transfer control frame to an Ethernet apparatus connected to the connection port having the packet rate lower than the predetermined reference value, wherein the data transfer control frame is a PAUSE frame, and (ii) a duration setting unit to determine a duration of the PAUSE frame, wherein to determine the duration comprises setting the duration to a predetermined maximum duration if the amount of packet data input through the connection port having the packet rate lower than the predetermined reference value is smaller than a predetermined threshold reference value and otherwise setting to half of the predetermined maximum duration, wherein the control frame generating unit generates the PAUSE frame such that a pause state is maintained for the determined duration.

6. The Ethernet switching apparatus of claim 5, wherein the duration setting unit further determines the duration using a grading scheme according to the amount of packet data to be transmitted through the connection port having the packet rate lower than the predetermined reference value.

7. The Ethernet switching apparatus of claim 5, further comprising:

one or more packet counters, each to count input and output states of packet data received through a corresponding connection port, wherein the control unit monitors the amount of packet data input through each connection port based on a count value of the counter and identifies a state of packet data.

8. The Ethernet switching apparatus of claim 7, wherein the packet counters are provided to correspond to respective ones of the connection ports.

9. The Ethernet switching apparatus of claim 5, wherein the control unit generates the data transfer control frame when underflow occurs in an input buffer in which the input packet data is stored.

10. The Ethernet switching apparatus of claim 5, wherein the control unit includes a media access controller (MAC).

* * * * *